(12) United States Patent
Sharma et al.

(10) Patent No.: US 8,675,532 B2
(45) Date of Patent: Mar. 18, 2014

(54) LOW POWER DIGITAL MEDIA BROADCAST RECEIVER WITH TIME DIVISION

(75) Inventors: Sridhar G. Sharma, Milpitas, CA (US); Oren Arad, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 218 days.

(21) Appl. No.: 13/191,222

(22) Filed: Jul. 26, 2011

(65) Prior Publication Data

US 2012/0020267 A1 Jan. 26, 2012

Related U.S. Application Data

(63) Continuation of application No. 12/815,967, filed on Jun. 15, 2010, now Pat. No. 7,990,934, which is a continuation of application No. 11/389,277, filed on Mar. 23, 2006, now Pat. No. 7,742,458.

(60) Provisional application No. 60/664,990, filed on Mar. 24, 2005.

(51) Int. Cl.
*G08C 17/00* (2006.01)
*H04J 3/00* (2006.01)

(52) U.S. Cl.
USPC .......................................... 370/311; 370/337

(58) Field of Classification Search
USPC ................. 370/311, 314, 321, 328, 337, 347
See application file for complete search history.

(56) References Cited

U.S. PATENT DOCUMENTS

| | | | |
|---|---|---|---|
| 4,710,747 A | 12/1987 | Holland | |
| 4,761,644 A | 8/1988 | Kawai et al. | |
| 4,910,752 A | 3/1990 | Yester, Jr. et al. | |
| 5,140,698 A | 8/1992 | Toko | |
| 5,155,479 A | 10/1992 | Ragan | |
| 5,325,088 A | 6/1994 | Willard et al. | |
| 5,555,183 A | 9/1996 | Willard et al. | |
| 5,587,706 A * | 12/1996 | Branner et al. | 340/7.36 |
| 5,654,952 A | 8/1997 | Suzuki | |
| 5,831,544 A * | 11/1998 | Park | 340/7.33 |
| 5,854,994 A * | 12/1998 | Canada et al. | 702/56 |
| 5,878,336 A * | 3/1999 | Cashen et al. | 455/343.4 |

(Continued)

FOREIGN PATENT DOCUMENTS

JP 2007243504 9/2007

OTHER PUBLICATIONS

U.S. Appl. No. 11/454,268, Oren Arad, Systems and Methods for Dynamically Controlling a Tuner, filed Jun. 16, 2006.

(Continued)

*Primary Examiner* — Andrew Lee
(74) *Attorney, Agent, or Firm* — Pillsbury Winthrop Shaw Pittman LLP

(57) ABSTRACT

Systems and methods for providing a low power receiver device using fine grained time division are provided. In one embodiment, the receiver device comprises a tuner, a demodulator configured to demodulate at least one sampled signal, a payload processor configured to process at least one demodulated signal into an output format, and a time division control logic configured to generate a control signal to switch at least one component within the receiver device between modes to conserve power. The at least one component may be switched between an active mode, a standby mode, a power off mode, and a low power mode. In further embodiments, the at least one component may be switched between staggered modes.

21 Claims, 14 Drawing Sheets

(56) References Cited

U.S. PATENT DOCUMENTS

| | | | |
|---|---|---|---|
| 5,920,824 A | 7/1999 | Beatty et al. | |
| 6,057,795 A | 5/2000 | Suzuki | |
| 6,072,784 A | 6/2000 | Agrawal et al. | |
| 6,073,035 A * | 6/2000 | Witter | 455/574 |
| 6,205,225 B1 | 3/2001 | Orban | |
| 6,219,333 B1 | 4/2001 | Ahn | |
| 6,232,905 B1 | 5/2001 | Smith et al. | |
| 6,259,681 B1 | 7/2001 | Kolev et al. | |
| 6,286,122 B1 | 9/2001 | Alanara | |
| 6,311,048 B1 | 10/2001 | Loke | |
| 6,317,065 B1 | 11/2001 | Raleigh | |
| 6,405,062 B1 | 6/2002 | Izaki | |
| 6,407,689 B1 | 6/2002 | Bazarjani et al. | |
| 6,438,364 B1 | 8/2002 | Waite | |
| 6,445,937 B1 * | 9/2002 | daSilva | 455/574 |
| 6,466,913 B1 | 10/2002 | Yasuda | |
| 6,487,425 B1 * | 11/2002 | Thakker et al. | 455/574 |
| 6,504,863 B1 | 1/2003 | Hellmark | |
| 6,654,595 B1 | 11/2003 | Dexter | |
| 6,671,371 B1 | 12/2003 | McNeill et al. | |
| 6,693,953 B2 | 2/2004 | Cox et al. | |
| 6,754,763 B2 | 6/2004 | Lin | |
| 6,763,240 B1 | 7/2004 | Chambers et al. | |
| 6,765,931 B1 | 7/2004 | Rabenko et al. | |
| 6,819,274 B2 | 11/2004 | Krone et al. | |
| 6,862,325 B2 | 3/2005 | Gay-Bellile et al. | |
| 7,006,617 B1 | 2/2006 | Dal Farra | |
| 7,127,008 B2 | 10/2006 | Kroeger | |
| 7,194,638 B1 * | 3/2007 | Larky | 713/300 |
| 7,205,923 B1 | 4/2007 | Bahai | |
| 7,233,275 B2 | 6/2007 | Aksin et al. | |
| 7,295,812 B2 | 11/2007 | Haapoja et al. | |
| 7,299,021 B2 | 11/2007 | Parssinen | |
| 7,369,989 B2 | 5/2008 | Absar | |
| 7,480,689 B2 | 1/2009 | Song | |
| 7,555,661 B2 | 6/2009 | Luu | |
| 2002/0126778 A1 | 9/2002 | Ojard | |
| 2002/0169009 A1 | 11/2002 | Reiner | |
| 2003/0078007 A1 | 4/2003 | Parssinen et al. | |
| 2003/0159076 A1 | 8/2003 | Delisle et al. | |
| 2004/0080675 A1 | 4/2004 | Hoshino | |
| 2004/0145508 A1 | 7/2004 | Gulati et al. | |
| 2004/0223449 A1 | 11/2004 | Tsuie et al. | |
| 2005/0047488 A1 | 3/2005 | Sugahara | |
| 2005/0081245 A1 | 4/2005 | Arad et al. | |
| 2005/0094036 A1 | 5/2005 | Tichelaar | |
| 2005/0239518 A1 | 10/2005 | D'Agostino et al. | |
| 2006/0001779 A1 | 1/2006 | Favrati et al. | |
| 2006/0082690 A1 | 4/2006 | Englert | |
| 2006/0112157 A1 | 5/2006 | Song | |
| 2006/0141974 A1 | 6/2006 | Campbell | |
| 2006/0195498 A1 | 8/2006 | Dobbek | |
| 2006/0212503 A1 | 9/2006 | Beckmann | |
| 2007/0080800 A1 | 4/2007 | Carbone et al. | |
| 2007/0112901 A1 | 5/2007 | Niktash | |
| 2007/0176816 A1 | 8/2007 | Wood | |
| 2008/0097764 A1 | 4/2008 | Grill | |
| 2009/0198753 A1 | 8/2009 | Touimi | |

OTHER PUBLICATIONS

U.S. Appl. No. 11/496,767, Oren Arad, Systems and Methods for Dynamically Controlling an Analog-to-Digital Converter, filed Jul. 31, 2006.

U.S. Appl. No. 11/800,209, Shay Waxman, Systems and Methods for Saving Power in a Digital Broadcast Receiver, filed May 3, 2007.

* cited by examiner

TABLE 1: DAB TRANSMISSION FRAME STRUCTURE

| TRANSMISSION MODE | I | II | III | IV |
|---|---|---|---|---|
| T_F (DURATION OF FRAME) | 96 ms 196608T | 24 ms 49152T | 24 ms 49152T | 48 ms 98304T |
| NUMBER OF CARRIERS | 1536 | 384 | 192 | 768 |
| NUMBER OF FAST INFORMATION BLOCKS (FIBs) | 12 | 3 | 4 | 6 |
| NUMBER OF OFDM SYMBOLS/FRAME | 76 | 76 | 153 | 76 |
| T_NULL | 26565T (~1.297 ms) | 664T (~324 us) | 345T (~168 us) | 1328T (~648 us) |
| OFDM SYMBOL DURATION | 2552T (~1.246 ms) | 638T (~312us) | 319T (~156 us) | 1276T (~623 us) |
| BANDWIDTH | 1.536 MBits/sec | 1.536 MBits/sec | 1.536 MBits/sec | 1.536 MBits/sec |
| USEFUL OFDM SYMBOL DURATION (RECIPROCAL OF CARRIER SPACING) | 2048T (1 ms) | 512 (250us) | 319T (125 us) | 1276T (500 us) |
| FICs/FRAME (IN BITS) | 3072 | 768 | 1024 | 1536 |
| NUMBER OF OFDM SYMBOL REQD FOR FIC | 3 | 3 | 8 | 3 |
| NUMBER OF CAPACITY UNITS PER OFDM SYMBOL | 48 | 12 | 6 | 24 |

FIG. 3c

TABLE 2 DETAILING STATE MACHINE OF FIG. 5a

| STATE | TRANSITION |
|---|---|
| STATE 50 TURNED ON | |
| | TRANSITION 59: NEXT STATE = THE RADIO RECEIVER 100 IS TURNED ON IN STATE 50 |
| | TRANSITION 510: NEXT STATE = ACQUISITION STATE 51. |
| ACQUISITION STATE 51 TIMING ACQUISITION STATE | |
| | TRANSITION 511: NEXT STATE = ACQUISITION STATE 51. |
| | TRANSITION 512: NEXT STATE = WAIT AND PROCESS MCI STATE 51. |
| WAIT AND PROCESS MCI STATE 52 | |
| | TRANSITION 513: NEXT STATE = WAIT AND PROCESS MCI STATE 52. |
| | TRANSITION 514: NEXT STATE = SYNC SYMBOL STATE 54. |
| | ALTERNATE TRANSITION 534: NEXT STATE = NULL SYMBOL STATE 53. |
| NULL SYMBOL STATE 53 | |
| | TRANSITION 515: NEXT STATE = NULL SYMBOL STATE 53. |
| | TRANSITION 516: NEXT STATE = SYNC SYMBOL STATE 54. |
| | TRANSITION 533: NEXT STATE = WAIT AND PROCESS MCI STATE 52. |
| SYNC SYMBOL STATE 54 | |
| | TRANSITION 517: NEXT STATE = FAST INFORMATION CHANNEL 320 SYMBOL STATE 55. |
| | TRANSITION 532: NEXT STATE = WAIT AND PROCESS MCI STATE 52. |
| FAST INFORMATION CHANNEL STATE 55 | |
| | TRANSITION 519: NEXT STATE = FIC SYMBOL STATE 55. |
| | TRANSITION 518: NEXT STATE = ACTIVE MODE STATE 58. |
| | TRANSITION 520: NEXT STATE = STANDBY MODE STATE 56. |
| | TRANSITION 531: NEXT STATE = WAIT AND PROCESS MCI STATE 52. |
| STANDBY MODE 56 | TRANSITION 522: NEXT STATE = STANDBY MODE STATE 56. |
| | TRANSITION 521: NEXT STATE = PREV SYMBOL STATE 57. |
| | TRANSITION 524: NEXT STATE = NULL SYMBOL STATE 53. |
| | TRANSITION 531: NEXT STATE = WAIT AND PROCESS MCI STATE 52. |
| PREV SYMBOL STATE 57 | |
| | TRANSITION 523: NEXT STATE = ACTIVE MODE STATE 58. |
| | TRANSITION 530: NEXT STATE = WAIT AND PROCESS MCI STATE 52. |
| ACTIVE MODE 58 STATE | |
| | TRANSITION 527: NEXT STATE = ACTIVE MODE STATE 58. |
| | TRANSITION 526: NEXT STATE = STANDBY MODE STATE 56. |
| | TRANSITION 525: NEXT STATE = NULL SYMBOL STATE 53. |
| | TRANSITION 529: NEXT STATE = WAIT AND PROCESS MCI STATE 52. |

FIG. 5b

| DESCRIPTION |
|---|
| THE RADIO RECEIVER 100 IS IN THE INITIALIZATION STATE ON POWER UP (i.e., INITIATING SW AND LOAD INTERNAL PARAMETERS AND INITIATE STATE MACHINES). |
| THE RADIO RECEIVER 100 INITIALIZES AND SOFTWARE IS DOWNLOADED. |
| AFTER SOFTWARE IS DOWNLOADED AND RADIO RECEIVER 100 COMPLETES INITIALIZATION, THE RADIO RECEIVER 100 ENTERS TIMING ACQUISITION STATE 51. |
| THE RADIO RECEIVER 100 ACQUIRES FRAME SYNCHRONIZATION. |
| THE RADIO RECEIVER 100 CONTINUES TRANSITION 511 UNTIL THE AQUISITION PROCESS IS COMPLETED. |
| THE RADIO RECEIVER 100 TRANSITIONS TO STATE 52 AFTER THE ECQUISITION PROCESS HAS COMPLETED. |
| THE RADIO RECEIVER 100 WAITS FOR THE MULTIPLEX CONFIGURATION SO AS TO BE ABLE TO DETERMINE SUBCHANNEL LOCATION IN THE MAIN SERVICE CHANNEL 330. |
| THE RADIO RECEIVER 100 CONTINUES UNTIL A VALID MCI HAS BEEN SENT OR PARSED. |
| AFTER A VALID MCL HAS BEEN RECEIVED BY THE RADIO RECEIVER 100 AND PROPERLY PARSED. |
| AFTER A VALID MCL HAS BEEN RECEIVED BY THE RADIO RECEIVER 100 AND PROPERLY PARSED. |
| THE RADIO RECEIVER 100 PROCESSES THE NULL SYMBOL 340 IN THE SYNCHRONIZATION CHANNEL 310. |
| THE RADIO RECEIVER 100 WAIT FOR THE NULL SYMBOL 340. |
| AFTER THE RADIO RECEIVER 100 RECEIVES THE NULL SYMBOL 340. |
| THE RADIO RECEIVER 100 TRANSITIONS ON A USER CHANNEL CHANGE. |
| THE RADIO RECEIVER 100 PROCESSES THE SYNC SYMBOL 350 IN THE SYNC CHANNEL 310. |
| THE RADIO RECEIVER 100 TRANSITIONS AFTER THE NEXT SYNC SYMBOL 350 IS RECEIVED. |
| THE RADIO RECEIVER 100 TRANSITIONS ON A USER CHANNEL CHANGE. |
| THE RADIO RECEIVER 100 PROCESSES THE FAST INFORMATION CHANNEL 320. |
| THE RADIO RECEIVER 100 TRANSITIONS WHILE THE FAST INFORMATION CHANNEL 320 SYMBOLS ARE TRANMITTED. |
| AFTER THE LAST FAST INFORMATION CHANNEL 320 SYMBOL IS RECEIVED BY THE RADIO RECEIVER 100 BUT BEFORE RADIO RECEIVER 100 PROCESSES THE FIRST SYMBOL IN THE MAIN SERVICE CHANNEL BELONGING TO A SUB-CHANNEL.. |
| AFTER THE LAST FAST INFORMATION CHANNEL 330 SYMBOL IS RECEIVED BY THE RADIO RECEIVER 100 BUT BEFORE RADIO RECEIVER 100 RECEIVES THE FIRST SYMBOL IN THE MAIN SERVICE CHANNEL 330 BELONGING TO A SUB-CHANNEL THAT DOES NOT NEED TO BE PROCESSED. |
| THE RADIO RECEIVER 100 TRANSITIONS ON A USER CHANNEL CHANGE. |
| THE RADIO RECEIVER 100 IS WITHIN THE STANDBY MODE. |
| THE NEXT SYMBOL RECEIVED BY THE RADIO RECEIVER 100 DOSE NOT CORRESPOND TO A SYMBOL THAT INDICATES THE START OF A SUB-CHANNEL BELONGING TO A SERVICE OF INTEREST.. |
| THE NEXT SYMBOL RECEIVED BY THE RADIO RECEIVER 100 CORRESPONDS TO A SYMBOL IMMEDIATELY BEFORE THE FIRST SYMBOL OF A SUB-CHANNEL BELONGING TO A SERVICE OF INTEREST.. |
| IF THE CURRENT SYMBOL RECEIVED BY THE RADIO RECEIVER 100 IS THE LAST SYMBOL OF A TRANSMISSION FRAM 300. |
| THE RADIO RECEIVER 100 TRANSITIONS BASED ON A USER CHANNEL CHANGE. |
| THE RADIO RECEIVER 100 PROCESSES A SYMBOL IMMEDIATELY BEFORE THE FIRST SYMBOL OF A SUB-CHANNEL OF INTEREST. |
| THE RADIO RECEIVER 100 TRANSITIONS ON THE RECEPTION OF A SYMBOL. |
| THE RADIO RECEIVER 100 TRANSITIONS BASED ON A USER CHANNEL CHANGE. |
| THE RADIO RECEIVER 100 PROCESSES SYMBOLS OF SUB-CHANNELS OF INTEREST |
| THE RADIO RECEIVER HAS RECEIVED A SYMBOL BUT THE SYMBOL IS NOT THE LAST SYMBOLS OF SUB-CHANNEL BELONGING TO THE SERVICE OF INTEREST. |
| THE SYMBOL RECEIVED BY THE RADIO RECEIVER 100 IS THE LAST SYMBOLS OF SUB-CHANNEL BELONGING TO THE SERVICE OF INTEREST AND IS NOT THE LAST SYMBOL OF A TRANSMISSION FRAME 300 |
| IF THE CURRENT SYMBOL RECEIVED BY THE RADIO RECEIVER 100 IS THE LAST SYMBOL OF A TRANSMISSION FRAME 300. |
| THE RADIO RECEIVER 100 TRANSMISSIONS BASED ON A USER CHANNEL CHANGE. |

FIG. 5b cont.

TABLE 3 REGISTER INFORMATION

Register 0 (860): Time division Configuration Control Register 0 to N-1
N indicates the maximum number of programmes/ensemble that a receiver will listen to at one time

| Enable | (N-1):0 | Time division Power Control Service Enable. The number of bits set need to correspond to the number of services being requested by the user. |

Register Set 1 (800) Time division Control Active Start Register (0 to N-1)
N indicates the maximum number of programmes/ensemble that a receiver will listen to at one time. These registers need to be programmed in ascending order

| start | 17:0 | Number of 2.048 MHz clocks after the start of the frame when the receiver transitions from standby to active mode. This corresponds to a programmable number of symbols prior to the symbol that contains the start of the capacity unit associated with the service. For Register 0 if this value coincides with the start of the Main Service Channel then the power control strobe stays active after FIC. |

Register Set (820) Time division Control Standby Start Register (0 to N-1)
N indicates the maximum number of programmes/ensemble that a receiver will listen to at one time. These registers need to be programmed in ascending order. It should be programmed in a consistent manner so as to not conflict with the Active start Register and each other

| stop | 17:0 | Number of 2.048 MHz clocks after the start of the frame when the receiver transitions from standby to active mode. This corresponds to the last symbol of the sub-channel associated with the service. |

**Register Set 3 (810): Time division Early Strobe Offset Control Register (0 to M-1)*N**
M indicates the cardinality of the finite set of Offsets (OFFSET_SET) supported by the Receiver. N indicates the maximum number of programmes/ensemble that a receiver will listen to at one time. These modes are in ascending order in terms of the amount of time it takes to transition from power down mode to active.

| offset | X-1:0 | Number of 2.048MHz clocks before the start of standby to active transition as specified by the Time division Control Active Start do you deassert the corresponding power down strobe. In this example embodiment the largest possible offset in $(2^X)$. |
| Power State | X+L:X | Power down state associated with this transition from standby to active. In this example embodiment the L tiers of power states are represented in a one hot encoded fashion. |

FIG. 8b

LOW POWER DIGITAL MEDIA BROADCAST RECEIVER WITH TIME DIVISION

CROSS-REFERENCE TO RELATED APPLICATIONS

This application is a continuation of U.S. patent application Ser. No. 12/815,967, filed Jun. 15, 2010, which is a continuation of U.S. patent application Ser. No. 11/389,277, now U.S. Pat. No. 7,742,458, filed Mar. 23, 2006, which claims the benefit of U.S. provisional patent application No. 60/664,990, filed Mar. 23, 2005, and entitled "Low Power Design of a Receiver using Timeslicing," the contents of all of which are incorporated herein by reference in their entireties.

BACKGROUND OF THE INVENTION

1. Field of the Invention

Embodiments of the present invention relate generally to digital media broadcast receivers and more particularly to low power digital media broadcast receivers with time division.

2. Background Art

The Eureka 147 Project developed a digital radio system based on digital audio broadcasting (DAB). Terrestrial digital multimedia broadcast (T-DMB) is an extension to the Eureka DAB specification and is designed to provide motion video to mobile devices.

DAB and T-DMB are based on an orthogonal frequency division multiplex (OFDM) spread spectrum technique which distributes data over a large number of carriers that are spaced apart at precise frequencies. This spacing provides the "orthogonality". The benefits of OFDM are high spectral efficiency, resiliency to radio frequency (RF) interference, and lower multi-path distortion.

While demodulating the OFDM transmitted signal, some components within the radio receiver can constantly require power while others may be shut off completely when not in use. Some components, however, may need to be powered prior to operating to allow for "warm up" time.

Therefore, there is a need for low power DAB and T-DMB systems with time division.

SUMMARY OF THE INVENTION

Embodiments of the present invention provide exemplary systems and methods for providing a low power receiver device using fine grained time division. In exemplary embodiments, the receiver device operates with Digital Audio Broadcast (DAB)/Terrestrial Digital Multimedia Broadcast (T-DMB). The receiver device may, in one embodiment, be a Eureka-147 DAB.

In a DAB/T-DMB system, multiple programs are multiplexed together in a single ensemble to take advantage of frequency diversity achieved through OFDM. A typical receiver device listens to a subset of services available in the ensemble. Embodiments of the present invention describe exemplary methods to activate components of the receiver device for only a small part of the time and still provide the services desired by the end user.

While some transmission standards have a concept of time division, it is a very coarse control and is not amenable for DAB/T-DMB receivers. Embodiments of the present invention extend the time division concept for fine grained power control of a RF tuner, analog/digital converters (ADCs), and baseband. The concept of fine grained time division, described herein, may be applied to any digital broadcast (satellite or terrestrial) where a service is time division multiplexed with other services and occupies a continuous timeslot in a transmission frame. By utilizing embodiments of the present invention, it is possible to have significant power savings, and thus make it very amenable for portable applications.

In one exemplary embodiment, the receiver device comprises a tuner configured to receive a signal, a demodulator configured to demodulate at least one sampled signal, a payload processor configured to process at least one demodulated signal into an output format, and a time division control logic configured to generate a control signal to switch at least one component within the receiver device between modes to conserve power. The at least one component may be switched between an active mode, a standby mode, a power off mode, and a low power mode. In further embodiments, the at least one component may be switched between staggered modes.

BRIEF DESCRIPTION OF THE DRAWINGS

FIG. 3c is Table 1 entitled "DAB Transmission Frame Structure" detailing the exemplary transmission frame.

FIG. 5b is Table 2 detailing the exemplary state machine of FIG. 5a.

FIG. 8b is Table 3 detailing exemplary register information.

DETAILED DESCRIPTION OF EXEMPLARY EMBODIMENTS

The Eureka DAB and T-DMB specification can offer near CD-quality sound, more stations, additional radio and data services, a wider choice of programs, ease of tuning, and interference-free reception. To take benefit of frequency diversity, the DAB and T-DMB systems can use a wide radio frequency (RF) channel of 1.536 MHz able to provide up to 1.824 kbps useful capacity. A user may receive one or more services over a receiver device configured with the Eureka DAB and/or T-DMB specification. A service within the DAB channel may be single audio stream, video stream, or data stream. A typical service uses 64 kbps to 384 kbps. Therefore, many services can be brought together into one DAB channel. Each service can be error protected and then split into small data units called capacity units. These capacity units can then be multiplexed together to form a single DAB frame. The DAB frame can then be split into bit pairs and modulated onto many orthogonal carriers. Each service may not be interleaved in time with other services. Further, each service, which typically has shorter time duration than the DAB frame, can occupy a continuous timeslot inside the DAB frame.

Figure 1:
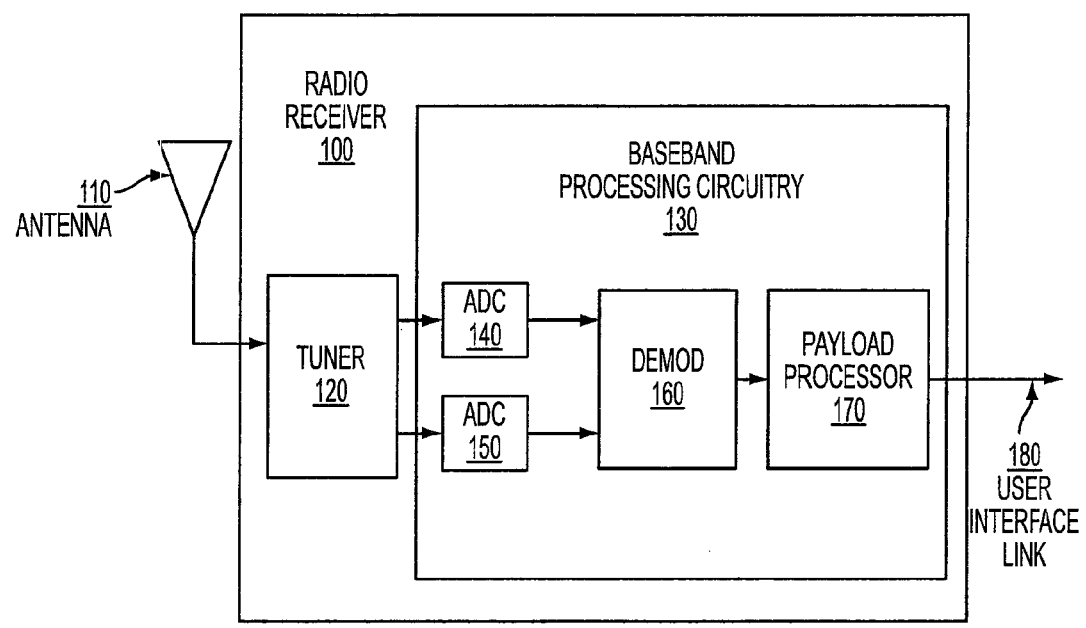
FIG. 1 is a block diagram of an exemplary radio receiver in an embodiment of the present invention.

FIG. 1 is a block diagram of an exemplary radio receiver 100. In one embodiment, the radio receiver 100 is a Eureka 147 DAB/T-DMB receiver capable of receiving, demodulating, and processing DAB signals and/or T-DMB signals. An antenna 110 is coupled to the radio receiver 100 and provides an RF signal to the radio receiver 100. The exemplary radio receiver 100 comprises a tuner 120 and a baseband processing circuitry 130. Although a radio receiver 100 is depicted within FIG. 1, any receiving/receiver device may be used with embodiments herein discussed.

The tuner 120 receives the RF signal over a specific RF band and down-converts the RF signal to some intermediate frequency (IF). In some embodiments, the tuner 120 down-coverts the RF signal to zero frequency.

Two analog-to-digital converters (ADCs) 140 and 150 of the baseband processing circuitry 130 sample the down-converted RF signal and generate a digital representation. In alternative embodiments, any number of ADC 140 (i.e., one or more) can sample the down-converted RF signal and generate the digital representation.

A demodulator (DEMOD) 160 demodulates the digital representation and recovers the information that was modulated in the transmitted RF signal. The DEMOD 160 can be implemented with digital logic circuitry or as firmware.

A payload processor 170 receives demodulated digital representation from the DEMOD 160. The payload processor 170 is configured to convert the demodulated signal into a form comprehensible to a user of the radio receiver 100. The payload processor 170 provides the processed demodulated signal to the user over a user interface link 180. In exemplary embodiments, the payload processor 170 can transmit audio to an amplifier, display video on a screen (i.e., monitor or television), and/or display data on the screen. In various embodiments, the payload processor 170 is further configured for header processing, decryption, and decompression of the demodulated signal. The payload processor 170 can be implemented in hardware, software on an embedded/external processor, or any combination thereof.

Lower power consumption by the radio receiver 100 can be achieved by placing portions of the radio receiver 100 in standby mode. It will be appreciated that many low power techniques could be applied, such as powering down, clock gating, and substrate gating.

Figure 2:
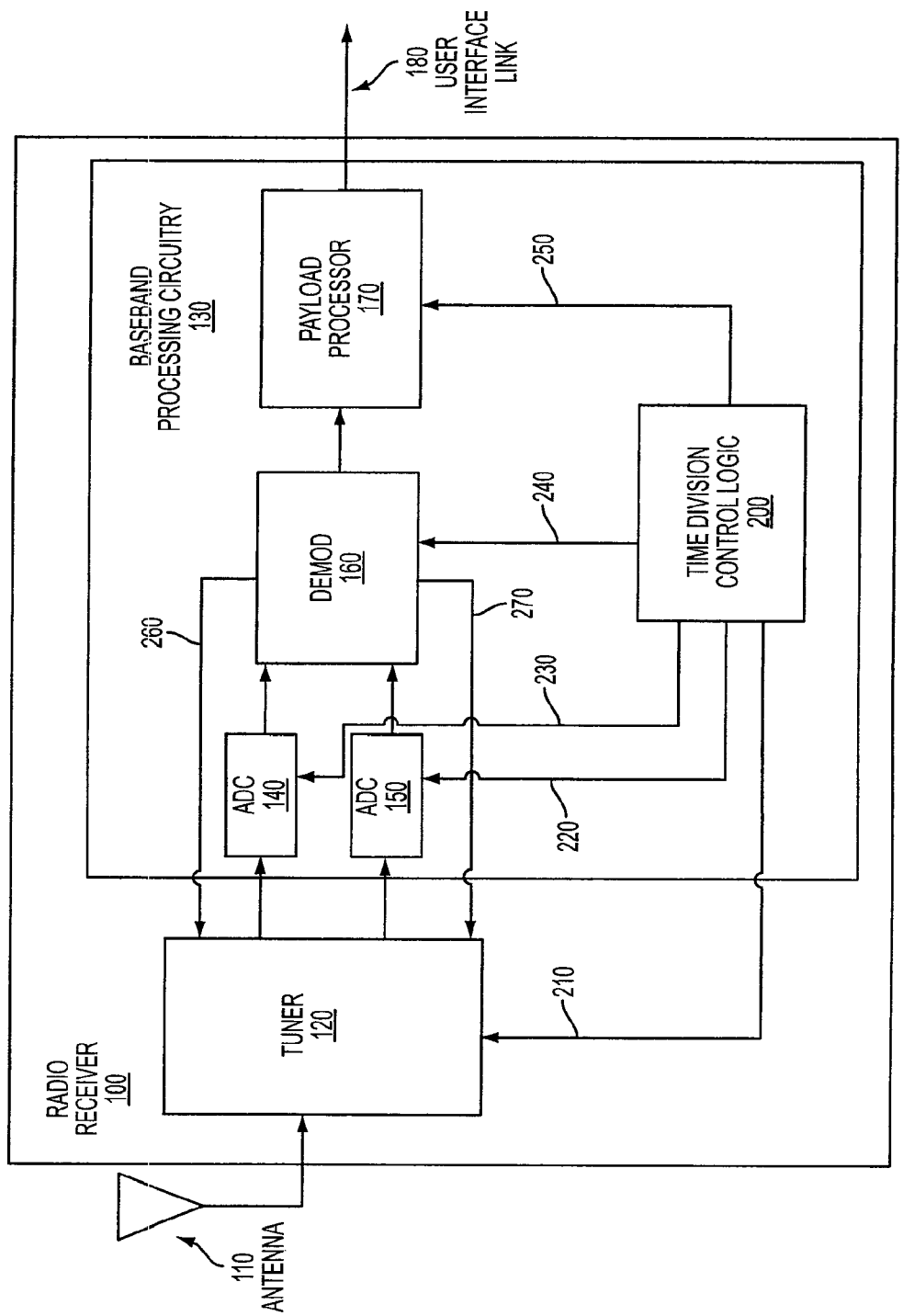
FIG. 2 is a block diagram of another exemplary radio receiver incorporating time division control in an embodiment of the present invention.

FIG. 2 is a block diagram of another exemplary radio receiver 100. In this embodiment, the radio receiver 100 comprises a time division control logic 200. The time division control logic 200 can send control signals to transition components within the radio receiver 100 from an active mode to a standby or power-off mode. Thus, for example, the time division control logic 200 can transmit control signals to the tuner 120 over a control bus 210. Similarly, time division control logic 200 can transmit control signals to the ADC 140 and the ADC 150 using control buses 230 and 220, respectively. Finally, the time division control logic 200 can transmit control signals to the DEMOD 160 and the payload processor 170 using control buses 240 and 250, respectively.

When the ADC 140 receives the control signals from the time division control logic 200, the ADC 140 may switch from an active mode to a standby mode. In some embodiments, the control signals switch both of the ADC blocks 140 and 150 from a powered-up state (i.e., active mode) to a powered-down state (i.e., standby mode) and back. In other embodiments, only parts of the ADC 140 and the ADC 150 may be powered-down. Alternatively, the ADC 140 may transition to a low power state. For example, upon receiving the control signal, the ADC 140 may lower the sampling frequency to reduce power consumption.

The time division control logic 200 can also transmit a control signal over control bus 240 to the DEMOD 160. In one embodiment, the control signal configures the DEMOD 160 to switch from the active mode to the standby mode. In another embodiment, the control signal configures the DEMOD 160 to adjust the frequency of operation based on the type and number of services that are requested by the user.

Time division control logic 200 can also transmit control signals to the payload processor 170 over control bus 250. The DEMOD 160 may also send control signals to the tuner 120 over control buses 260 and 270. In one example, the DEMOD 160 sends control signals to the tuner 120 to control the gain of one or more amplifiers within the tuner 120.

In some embodiments, the time division control logic 200 is always active. Further, the control buses 210, 220, 230, 240, 250, 260, and/or 270 can be implemented as standard buses (e.g., I2c, SPI) and/or as dedicated buses.

Figure 3A:
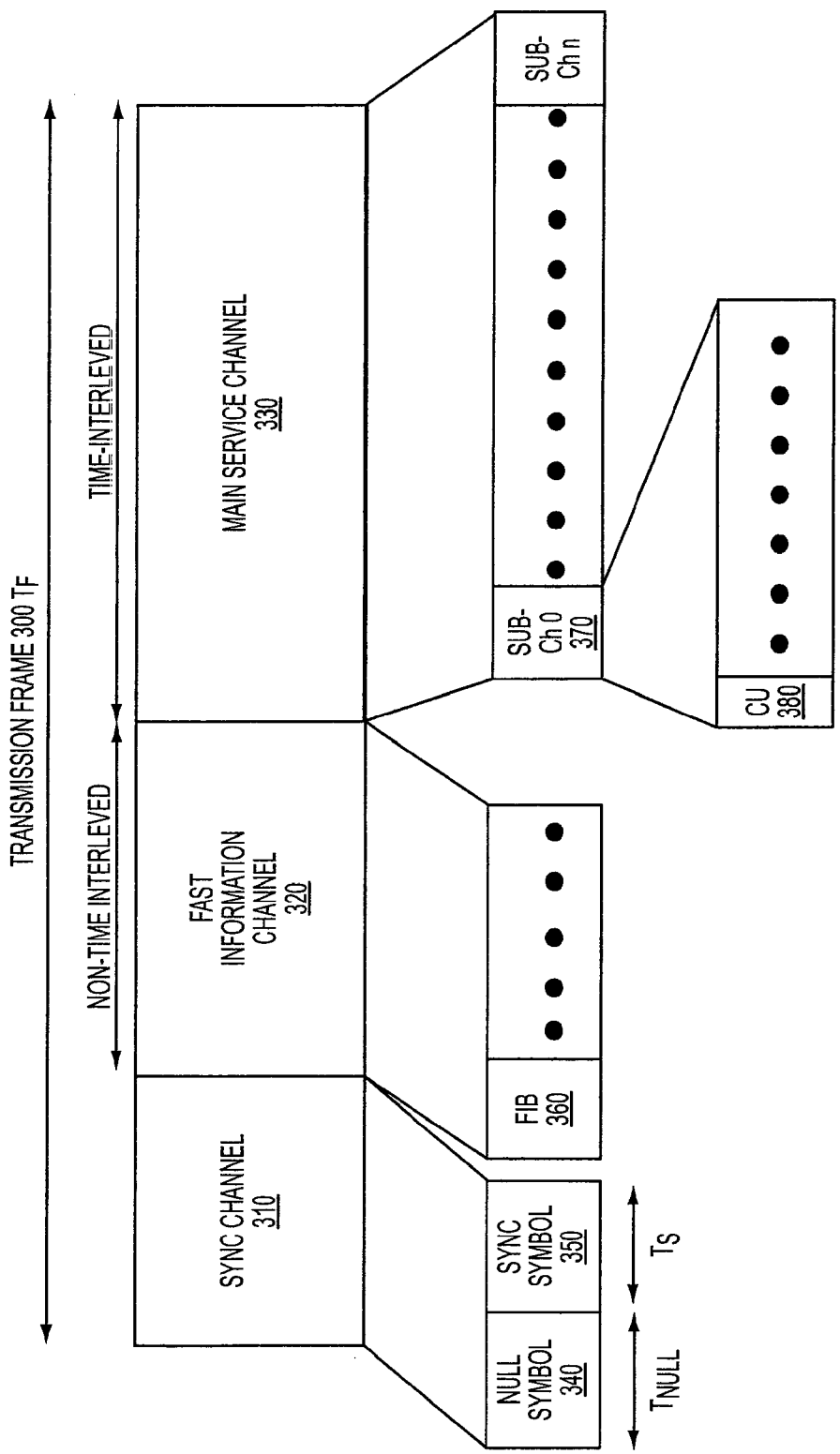
FIG. 3a shows the structure of a transmission frame in an embodiment of the present invention.

FIG. 3a shows the structure of a transmission frame 300 in an embodiment of the present invention. A transmitter (not shown) generates and transmits the transmission frame 300 within the RF signal to the antenna 110 (FIG. 1). The transmission frame 300 is configured to facilitate synchronization at the radio receiver 100 (FIG. 1).

The exemplary transmission frame 300 has a duration $T_F$ and is divided into a sequence of orthogonal frequency division multiplexing (OFDM) symbols. Each symbol comprises a number of carriers. Four different transmission modes can be defined as indicated in the DAB standards, and characteristics of these modes are defined in FIG. 3c. The number of OFDM symbols in a transmission frame 300 may be dependent on the transmission mode. The OFDM parameters are further discussed in Table 1 herein. (The DAB, timing shown in FIG. 3c, Table 1, is based on an elementary period T where T=1/2048000 seconds which corresponds to a clock period of 2.048 MHz Clock.)

The exemplary transmission frame 300 comprises a synchronization (sync) channel 310, a fast information channel 320, and a main service channel 330. The sync channel 310 in a transmission mode can comprise the first two OFDM symbols of the transmission frame 300. The first OFDM symbol of the sync channel 310 can be a null symbol 340 of duration $T_{NULL}$. The second OFDM symbol can be a sync symbol 350 of duration $T_S$.

The fast information channel 320 is formatted to provide rapid overhead and low delay data to the radio receiver 100. The fast information channel 320 comprises forwarding information bases FIB 360 which may further comprise multiplex configuration information (MCI), Service Oriented Information, and Network Oriented Information. The MCI is data associated with the DAB Multiplex (or Ensemble) organization. The MCI may further comprise a list of sub-channels (e.g., content type, position, protection, bit rate) and services characteristics (e.g., pointers to service components). The service oriented information is data associated with the contents of the sub-channels (e.g., program type, program language, and program number.) The network oriented information is data that is associated with the overall broadcasting system (e.g., list of transmitters broadcasting the ensemble, cross-references of services over various ensembles.)

In some embodiments, the fast information channel 320 is a non-time interleaved data channel with fixed error protection. The fast information channel 320 can be repeated cyclically for fast receiver synchronization and start up. Further, the fast information channel 320 can provide information required by the radio receiver 100 to establish the location within the frame of the data belonging to a service in use.

The MCI in the fast information channel 320 can also be non-interleaved and may be repeated often to allow the radio receiver 100 to function quickly after being powered on. If the ensemble configuration changes, an appropriate multiplex reconfiguration may be sent to notify the radio receiver 100 of this change. In some embodiments, this is done several frames in advance.

The main service channel 330 comprises common interleaved frames (CIF's). The exemplary CIF contains 55,296 bits. The smallest addressable unit is a capacity unit (CU) 380 containing 64 bits. There may be 864 CUs 380 in each CIF. The main service channel 330 is subdivided into sub-channels 370. Each sub-channel 370 comprises an integral and consecutive number of CUs 380. Further, the each sub-channel 370 carries a single service of audio, video, or data. In various embodiments, only a portion of the sub-channels 370 carry data that belongs to a service in use. As a result, a plurality of sub-channels 370 within a frame can carry services that are not in use. The time division control logic 200 (FIG. 2) can determine the time slots corresponding to the unused sub-channels and generate control signals to switch these radio receiver 100 components into sleep or standby mode. The format of the main service channel 330 is known and can be well understood by someone skilled in the art.

Figure 3B:
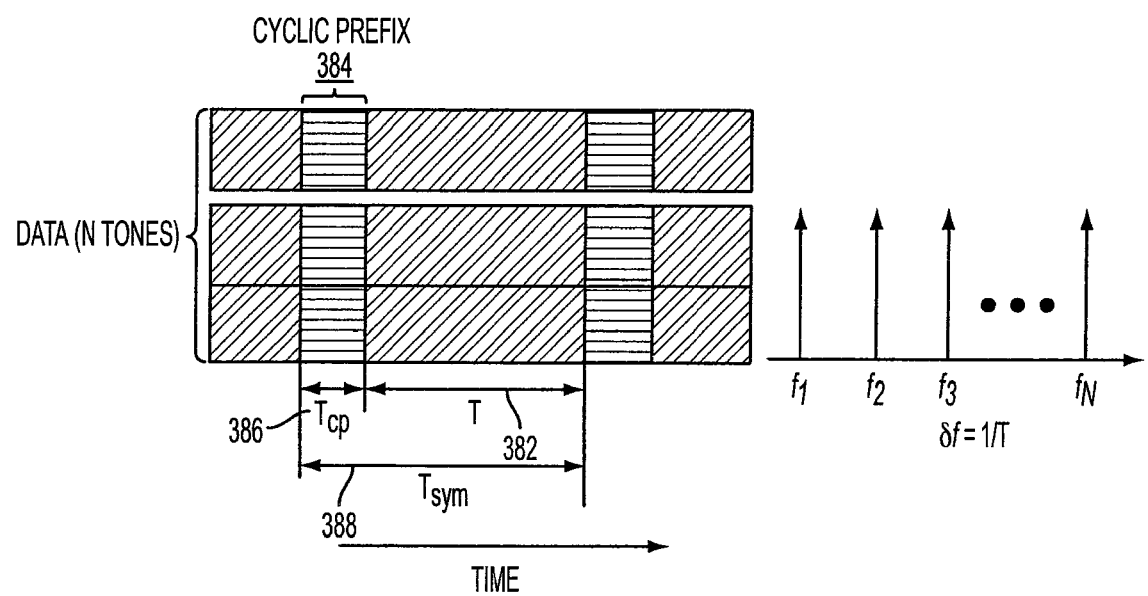
FIG. 3b shows a symbol format within the exemplary transmission frame.

Referring now to FIG. 3b, a symbol format within the transmission frame is shown. Orthogonal Frequency Division Multiplexing (OFDM) is a modulation technique that enables user data to be modulated onto orthogonal tones. Special properties of OFDM prevent adjacent symbols in OFDM systems from interfering with one another. Frequencies are chosen such that there are integral numbers of cycles in a symbol period 382. In order to insure orthogonality under dispersive channel conditions, many OFDM systems incorporate a guard band between one symbol to another symbol. One example of such a guard band is a cyclic prefix 384. The cyclic prefix 384, which may be a copy of a last portion of the data symbol, is appended to a front of the symbol to form a guard interval 386 that eliminates inter-symbol interference. The symbol is extended to $T_{sym}$ 388. The cyclic prefix 384 is sized appropriately to serve as a guard time to eliminate symbol interference. In some embodiments, the guard band may not be utilized since it does not carry additional data information.

In one embodiment, when the receiver implementation chooses to ignore the cyclic prefix 384, portions of the radio receiver 100 can be turned off during the guard band/cyclic prefix time 384 of an OFDM symbol using techniques of fine grained time division. This will require very accurate timing control of the precise time at which the different components are turned on and off. By turning on and off portions of the radio receiver 100 during the cyclic prefix time 384, power savings can be achieved in the radio receiver 100. The amount of power savings is a function of the duration of cyclic prefix and on/off times of the various components of the radio receiver 100. The fine grained time division control during the cyclic prefix time 384 can, in general, be applied to any OFDM receiver.

Figure 4:
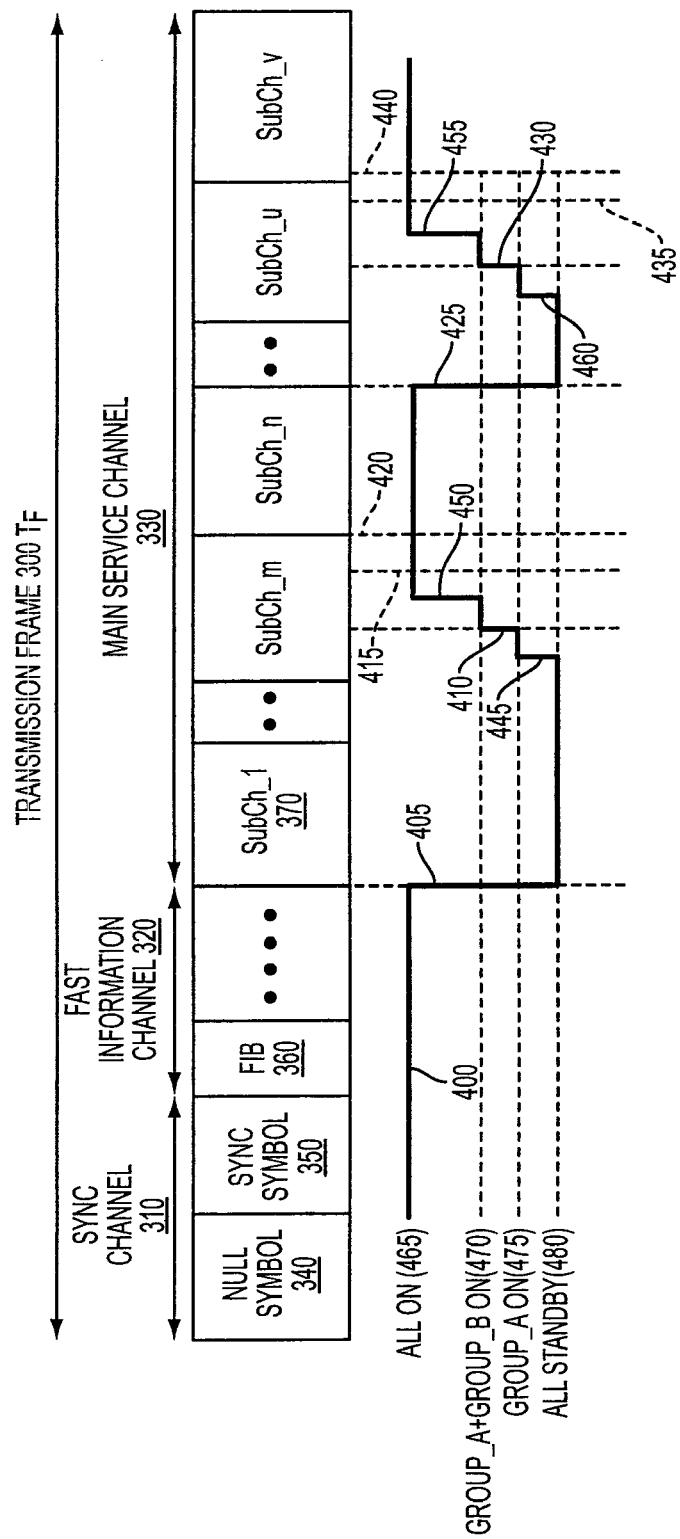
FIG. 4 shows an exemplary application of the time division control logic within the transmission frame.

FIG. 4 shows an exemplary application of the time division control logic 200 within the transmission frame 300 in one embodiment of the present invention. FIG. 4 depicts control states within the time division control logic 200 that transitions from an active mode 465 to a standby mode 480.

The radio receiver 100 (FIG. 1) may be in the active mode 465 mode when the sync channel 310 and the fast information channel 320 are received in order to establish synchronization and determine the location of the timeslots corresponding with the services in use. Since the radio receiver 100 may process only a small number of CUs 380 (FIG. 3A) in the main service channel 330, components of radio receiver 100 can be placed in the standby mode 480 while receiving a part of the main service channel 330. The amount of time the radio receiver 100 can be in the standby mode 480 may be based on the services requested by the user.

In various embodiments, the radio receiver 100 switches from the active mode 465 to the standby mode 480 and back during the transmission time frame 300. In one example, the radio receiver 100 is in the active mode 465 when the null symbol 340, sync symbol 350, and the FIB 360 part of transmission frame 300 is received. A time line 405 indicates the end of the fast information channel 320 and the start of a sequence of OFDM symbols belonging to unused sub-channels within the main service channel 330. The control state of the radio receiver 100 can transition from active mode 465 to standby mode 480 approximately at the time line 405. In another example, the radio receiver 100 is set to the standby mode 480 while receiving the null symbol 340 when the null symbol 340 is not used for timing recovery or adjustment.

Time lines 420 and 440 can indicate a starting capacity unit (time) during the main service channel 330 when the desired sub-channel is reached. If a non-differential modulation technique is used, this can represent a latest time (on a symbol boundary) when the radio receiver 100 may transition from the standby mode 480 to the active mode 465 so that the OFDM signal can be demodulated. If a differential modulation technique (like differential quadrative phase shift keying or DQPSK) then the latest wakeup time can be the previous OFDM symbol.

Time lines 415 and 435 indicate a previous OFDM symbol start. In one example the starting CU 380 is in the middle of an OFDM symbol. In this case, the demodulation process can start at the beginning of that particular OFDM symbol. From the time division perspective, the radio receiver 100 can be transitioned to the active mode 465 from the standby mode 480 at the beginning of the OFDM symbol (Non-Differential Modulation) or at the beginning of the previous OFDM symbol (Differential Modulation).

It is possible that the radio receiver 100 only transitions to the active mode 465 at the beginning of a transmission frame (i.e., while the sync channel 310 and the fast information channel 320 are received) and at the end of the Main Service Channel 330. In this case, the time that the radio receiver 100 is in standby mode is almost the entire duration of the transmission frame 300 (i.e., $T_F$).

In some embodiments, the channel characteristics may have dramatically changed from the time when the radio receiver 100 is last in active mode 465. To overcome these problems, the radio receiver 100 transitions to active mode 465 before receiving a programmable number of OFDM symbols prior to the symbol of interest so as to be able to estimate channel parameters. In FIG. 4, time lines 415 and 435 are not constrained to be the previous OFDM symbol but are at a programmable offset.

This programmability can also allow sufficient lead-time for the DEMOD 160 (FIG. 1) to receive OFDM symbols before the start of the sub-channel 370, in order to estimate demodulation parameters such as input signal gain.

In practice, there may be a lag between when a circuit is "woken up" and when the circuit can be stable and operational. The lag may vary with the type of circuit. As a result, the circuit can be transitioned to the active mode 465 to account for the lag. This is illustrated with time lines 410, 415, 445, 450, 455, and 460. Since different circuits may have different requirements before they are stable, a finite set of offsets from the desired wakeup times (e.g., staggered wake-ups) may be defined. As a result, staggered modes may be implemented.

For example, two components may be in standby mode. The first component requires a longer wakeup time. The transitioning to active mode may be staggered by transitioning the first component early and then the second component. Staggering modes can be based on the requirements of the component, requirements of groups of components, expected data flow, duration during the transmission frame 300, or symbols received. The staggered modes may be implemented by the time division control logic 200 (FIG. 2). Further, the staggered modes may be programmed as discussed in FIG. 8.

In the exemplary embodiment shown in FIG. 4, the radio receiver 100 components are divided a plurality of groups based on component wake-up time from the standby mode 480 to the active mode 465. In one embodiment, the groups comprise Group_A and Group_B. The wake up time of Group_A is greater then Group_B. Accordingly, the time division control logic 200 can transition each group at a different time offset from the originally expected active time, represented by time lines 415 and 435. Components of Group_A are switched to the active mode 465 at time lines 445 and 410. Components of Group_B are switched to the active mode 465 at time lines 410 and 430. Components of Group_B are also switched to the active mode at time lines 450 and 455. The time offsets between the start of the sub-channels 370 in use and the transition from the standby mode 480 to the active mode 465, can be independently programmable for each group of components.

In exemplary embodiments, the DEMOD 160 and the tuner 120 (FIG. 1) can form an automatic gain control (AGC) loop. The input signal can pass through the DEMOD 160 over control buses 260 and 270 (FIG. 2) to the tuner 120 to produce the output level to be stabilized. The DEMOD 160 output can be compared against a setpoint voltage which is then processed to produce a gain control voltage. This gain control voltage is applied to the control input. AGC components within the tuner 120 are further discussed in FIG. 6.

The radio receiver 100 may wake up at the beginning of a transmission frame 300 (i.e., sync channel 310) and at the end (i.e., main service channel 330). In this case, the time that the radio receiver 100 is in the standby mode 480 is almost equal to the duration of the transmission frame 300 (i.e., $T_F$).

If the radio receiver 100 is traveling slowly or stationary then the AGC tracking loop can be disabled when in the standby mode. The assumption is that the signal strength is the same between one transmission frame 300 and the next because the fading characteristics may be nearly the same. The other adaptive algorithms in the radio receiver 100 may have similar problems because the channel characteristics may have changed from the time when the radio receiver 100 is last on. To overcome these problems, the radio receiver 100, in one embodiment, transitions to the active mode 465 within a programmable number of OFDM symbols prior to the symbol of interest so as to be able to estimate channel parameters. In exemplary embodiments, the radio receiver 100 is aware of the forthcoming symbol of interest based on information in the MCI in combination with the transmission mode as will be described in more detail below. In FIG. 4, time lines 415 and 435 are not constrained to be the previous OFDM symbol but may be configured to be at a programmable offset. This programmability can allow each group to transition to the active mode 465 with sufficient time ahead of the sub-channel start, to accommodate wake up time of the components.

There may be variability of the amount of time spent in standby state 414. The variability may depend on the location of the sub-channels 370 corresponding to the services in the main service channel 330. Sometimes the amount of time in the standby mode 480 does not warrant a full power down on circuits with a large wake up and sleep hysteresis. Hence, a tier of power down states with progressively lower power consumption and longer wakeup times may be defined. In one particular example, all of the circuits can be classified into an M set of finite offsets (OFFSET_SET) and L tiers of power down states.

The timeline 450 indicates a time to transition some of the circuitry into the standby mode 480. Since different circuits/components will have different sleep modes and timing, there may be multi-stage sleep sequences. The concepts explained herein can be easily extended by someone skilled in the art to support multi-stage sleep modes of components.

Figure 5A:
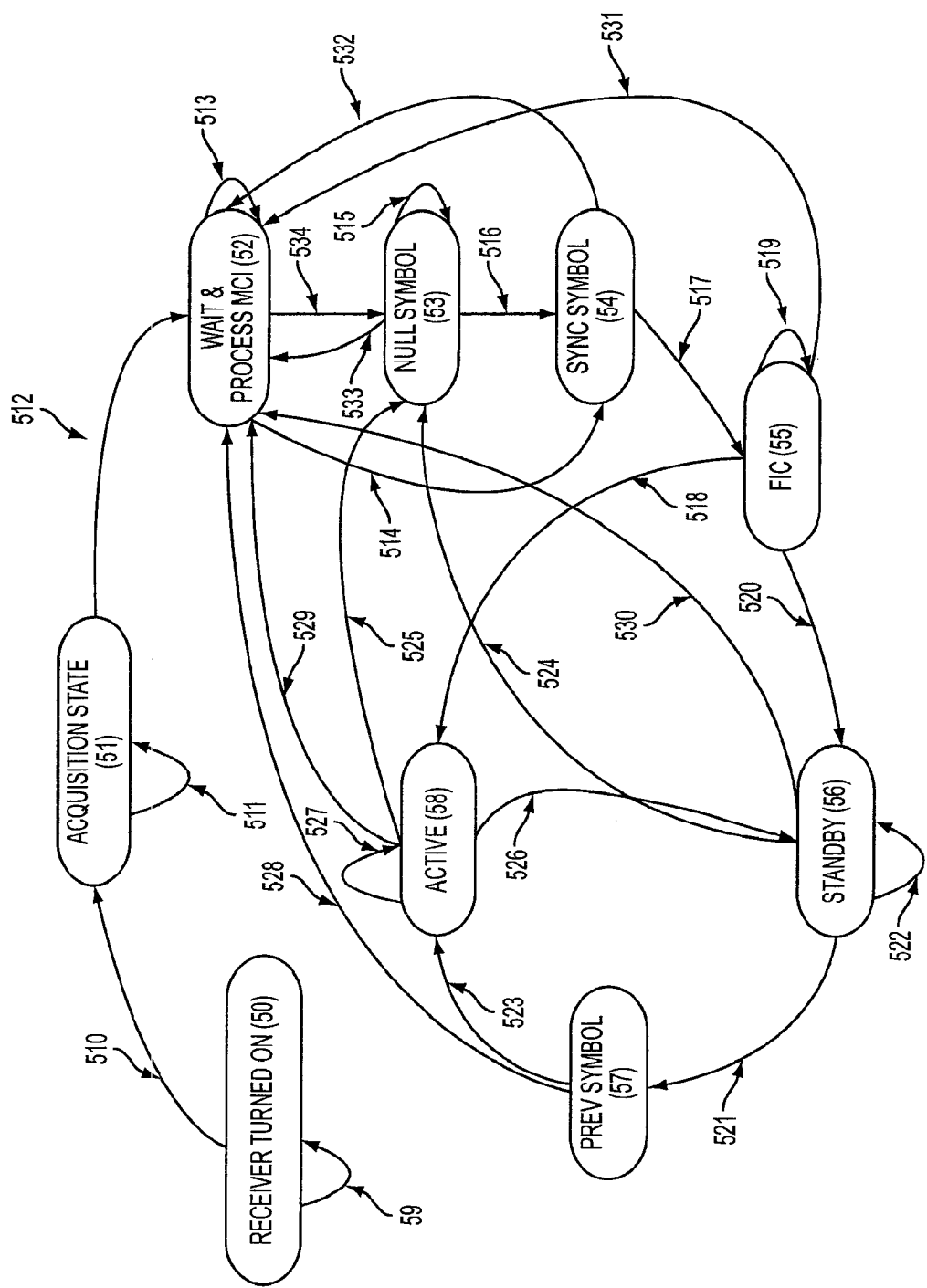
FIG. 5a shows an example of a state machine that illustrates the time division concept.

FIG. 5a shows an example of a state machine that illustrates the time division concept of embodiments of the present invention. On startup, the radio receiver 100 (FIG. 1) is turned on in state 50. Subsequently, the radio receiver 100 waits to process a multiplex configuration information message (MCI) in the fast information channel 320 (FIG. 3a) in state 52. During processing of the MCI, the MCI is parsed and the starting capacity units and the number of capacity units corresponding to the desired services are determined.

Once the MCI has been parsed, the radio receiver 100 waits for a deterministic symbol (e.g., null symbol 340 or sync symbol 350 of FIG. 3a) in the transmission frame 300 (FIG. 3a) and transitions to either the null symbol state 53 or sync symbol state 54. The radio receiver 100 then transitions to the sync symbol state 54 or the fast information channel state 55. During the main service channel 330, the radio receiver 100 can transition between an active mode 58, a prey symbol state 57, and/or a standby mode state 56. In an exemplary embodiment, in all the states, except the standby mode 56, the radio receiver 100 is completely powered on. FIG. 5b is Table 2 detailing the state machine of FIG. 5a.

Figure 6:
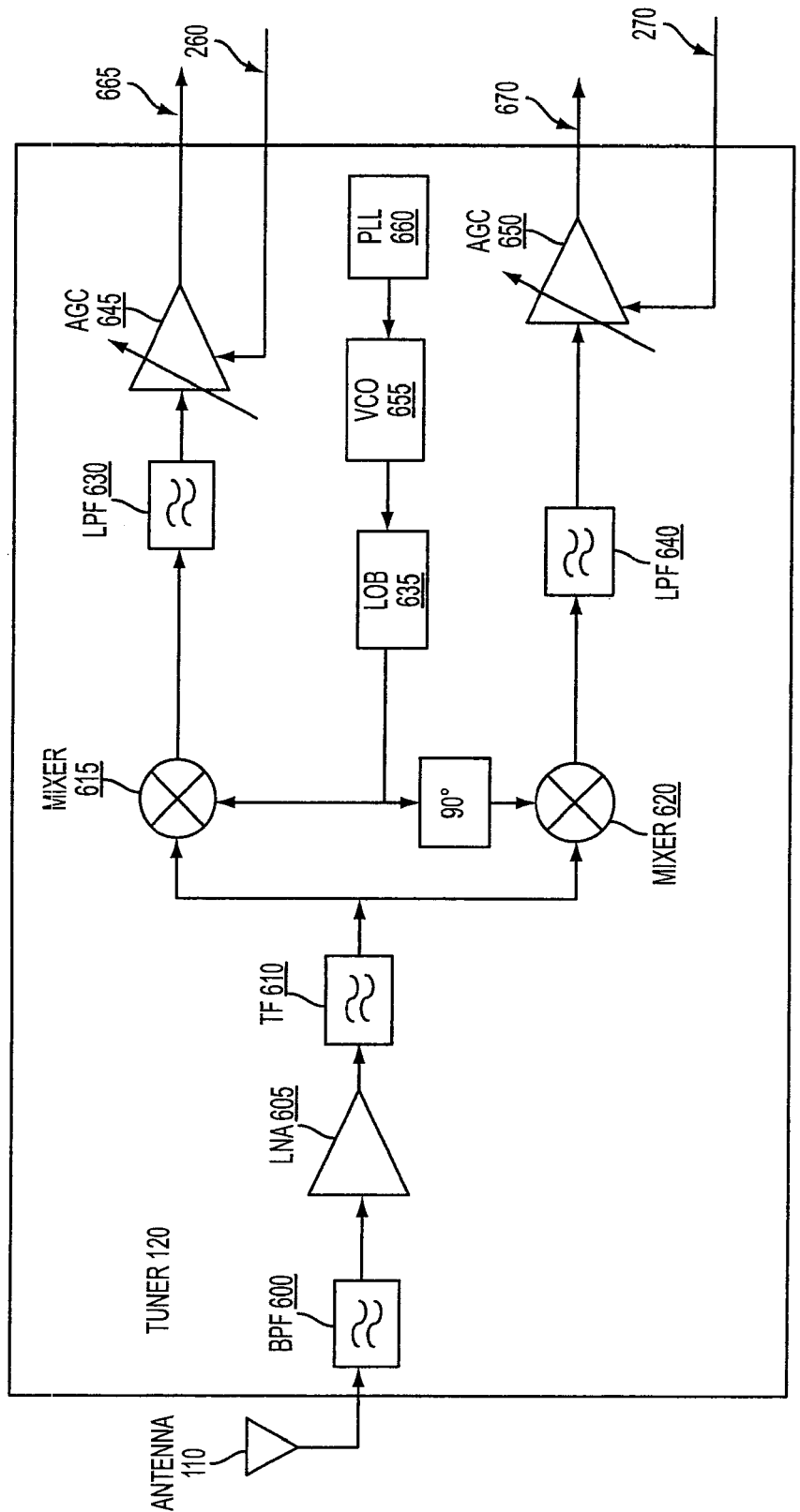
FIG. 6 shows an example interaction of a demodulator and the time division control.

FIG. 6 shows an exemplary DAB/T-DMB tuner 120 with a direct conversion architecture whose power dissipation is controlled by time division in an embodiment of the present invention. This direct conversion architecture is well described in prior art. It should be well understood by one skilled in the art that the methods described herein can be used in any other tuner architecture such as dual conversion, super heterodyne, or a modified version of the tuner described herein.

A RF signal is received by the antenna 110 and transmitted through a band pass filter (BPF) 600. The BPF 600 allows select frequencies to pass through a band of interest. Thus, the BPF 600 can eliminate or reduce noise from the RF signal. A signal of interest is contained within the frequencies that pass through the BPF 600 to a low noise amplifier (LNA) 605 which amplifies the filtered RF signal of interest.

The RF signal is filtered by tracking filter (TF) 610. The signal is then split into two branches: an inphase branch and a quadrature phase branch. The signal in the inphase branch is mixed in a mixer 615 with a sinusoid signal to produce a replica of the RF signal centered on a low intermediate frequency (IF). In some embodiments, the replica of the RF signal is centered on zero frequency (DC). The down-converted RF signal is then passed through a low pass filter (LPF) 630 that rejects signals which are outside the band of the signal of interest. An automatic gain control AGC circuitry 645 adjusts the filtered RF signal power to a desired level. The AGC circuitry 645 outputs the filtered RF signal over bus 665 to the ADC 140 (FIG. 1) for sampling.

Similarly on the quadrature phase branch, the RF signal is mixed in mixer 620 with a sinusoid signal shifted by 90 degrees relative to the inphase sinusoid, to produce a replica of the RF signal centered on a low IF (or, in some embodiments, centered on DC). The down-converted RF signal is then passed through LPF 640 that rejects signals that are outside the band of the signal of interest. AGC circuitry 650 adjusts the filtered RF signal power to a desired level. The AGC circuitry 650 then outputs the filtered RF signal over bus 670 to ADC 150 (FIG. 1) for sampling.

The tuner 120 also includes phase locked loop (PLL) 660, voltage controlled oscillator (VCO) 655, and local oscillator buffer (LOB) 635 to generate the mixing sinusoid signal to the mixers 615 and 620. In some embodiments, a 90 degree shifter shifts the sinusoid phase by 90 degree to generate the phase shifted sinusoid signal to the mixer 620.

In various embodiments, the tuner 120 contains a large number of active components including the BPF 600, LNA 605, TF 610, mixers 615 and 620, LPFs 630 and 640, LOB 635, AGC circuitry 645 and 650, VCO 655, and PLL 660. These active components can be powered down to reduce power consumption during the standby mode.

In addition, the tuner 120 can contain analog support circuitry such as a bandgap reference. A bandgap reference is an active circuit and can be powered down or put into a low power mode during the standby mode.

It is possible by someone skilled in the art to design a tuner 120 where there is any number of active components. In one example, the tuner 120 may be built where the BPF 600, TF 610, mixers 615 and 620, and LPFs 630 and 640 are designed as passive components. It should be well understood that the methods described herein can be used in any other tuner architecture having a different combination of active and passive components.

In exemplary embodiments, the active components can require different wakeup times. Also, the active components may have a tier (i.e., stages) of power saving modes depending on the period of time in standby mode. The power control logic can be performed by the time division control logic 200 (FIG. 2) to power down the active components in the tuner 120. In some embodiments, power control signals are mapped from the power control logic to each active component. This mapping can be programmed. In various embodiments, the power control signals are each L bits wide. In some embodiments, the power control signal can be M signal buses which are log 2 (L) bits wide. Those skilled in the art will appreciate that this is equivalent to having M signal buses which are L bits wide if a one-hot encoding scheme is used. It should also be well understood that the methods described herein can be result in many schemes for controlling power.

A tradeoff in many tuner 120 designs is power versus gain, noise figure, and linearity. For example, a tuner 120 which is designed for very low noise figure, high linearity, and high gain can consume much more power than a tuner 120 with high noise figure, low gain, and low linearity. A large part of the power may be consumed by the LNA 605, the AGC circuit 645 and the AGC circuit 650. The power consumed by the amplifiers can be reduced by controlling the bias current of the amplifiers or turning off some of the amplifier stages.

During the standby mode, the radio receiver 100 may not be performing demodulation. As a result, the ADC 140 and the ADC 150 may be inactive. A low power mode can be defined where the LNA 605, the AGC 645 and the AGC 650 are placed in low gain, low linearity, and high noise figure mode. In one example, the transition time to achieve the low power mode can be faster than powering down the LNA 605, the AGC circuit 645, and the AGC circuit 650. The low power mode can be one of the tiers of power down states. In another example, the entire tuner 120 can be powered down. In yet another example, the tuner 120 is powered down with the exception of the VCO 655 and PLL 660. In some embodiments, the PLL 660 lock time is a function of the frequency of operation which can be taken into account when the optimal power down mode of the tuner 120 is determined. It should be noted that in various embodiments, any or all components of the tuner 120 maybe powered down or transitioned to a low power mode.

In some embodiments, the ADC 140 and the ADC 150 can support a tier of power saving modes. In one example, the ADC 140 and the ADC 150 can support three states (i.e., modes) including an active state, a low sampling rate state, and a power down state. The tier structure can be designed to provide a tradeoff between power savings and the wakeup/sleep time.

Figure 7:
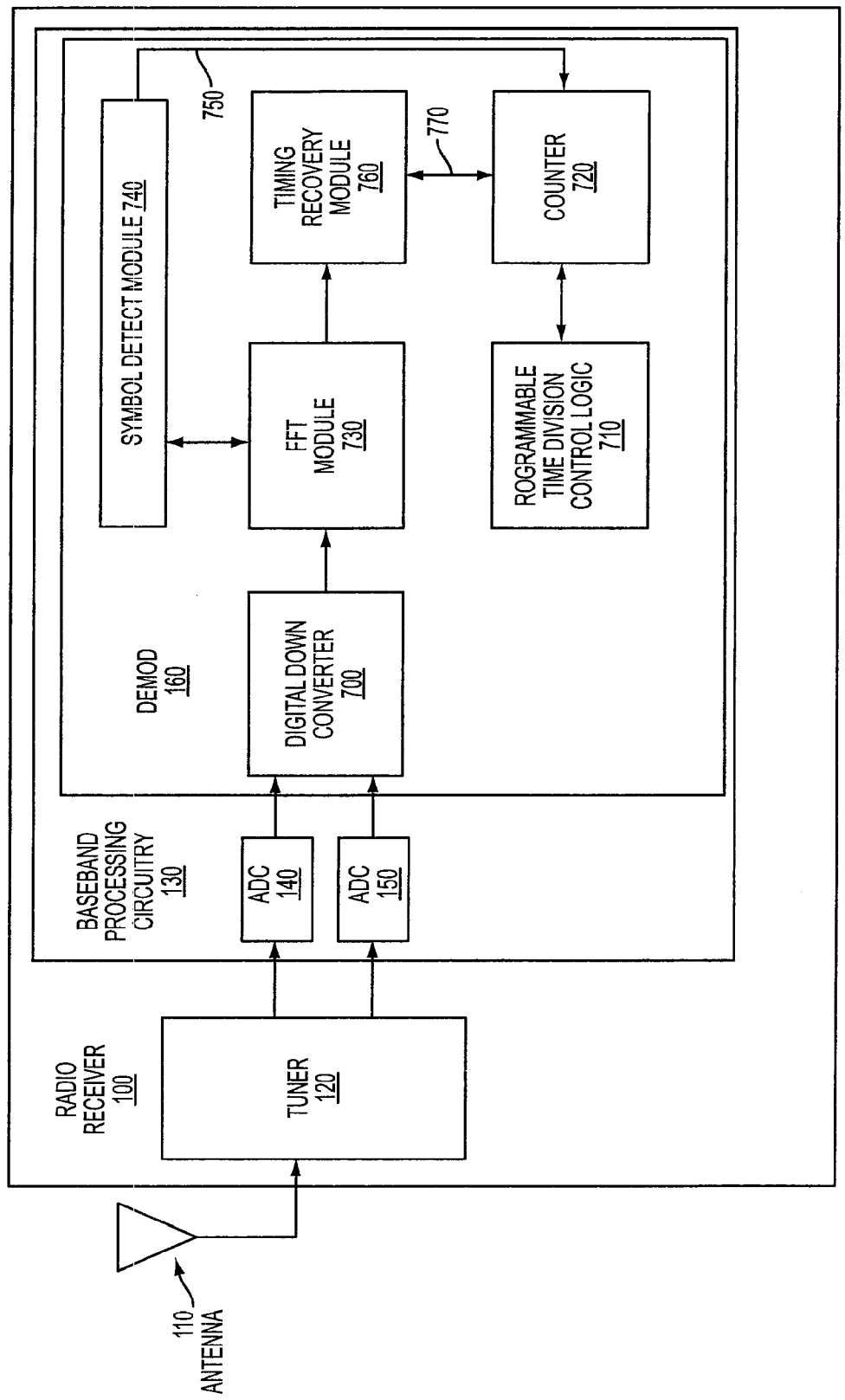
FIG. 7 shows an exemplary implementation of a programmable time division control logic in an embodiment of the present invention.

FIG. 7 shows an example interaction of the DEMOD 160 and the time division control in an embodiment of the present invention. The DEMOD 160 can be implemented in hardware, software, firmware, or a combination thereof. In one embodiment, the DEMOD 160 forwards data to the payload processor 170 via a deinterleaver and viterbi (convolutional) decoder.

A digital down converter 700 receives RF signals from the ADC 140 and the ADC 150 and converts the RF signals to a DAB/T-DMB specific rate. A fast fourier transform (FFT) module 730 extracts the carrier signal from the RF signals by performing a fast fourier transform.

A timing recovery module 760, processes the OFDM symbols from the carrier signals and determines timebase corrections that need to be applied to the digital down converter 700. The timing recovery module 760 can also generate a clock signal which may be locked to the OFDM symbol rate. A counter 720 receives the clock signal via bus 770 and tracks time progress in the frame. A symbol detect module 740 detects the null symbols 340 (FIG. 3a) or the sync symbols 350 (FIG. 3a) and generates the frame start indicator signal to indicate the start of the transmission frame 300 (FIG. 3a) based on the detected null symbols 340 and/or the sync symbols 350.

The counter 720 receives the frame start indicator signal from the symbol detect module 740 via bus 750. The start of frame start indicator signal reinitializes the counter 720. The programmable time division control logic 710 uses counter 720 to determine when to change control states between the active mode and the standby mode. The programmable time division control logic 710 can incorporate any number of control states, and is capable of independently transitioning each one of the control states from one to another. In some embodiments, the counter 720, clock signal, and the programmable time division control logic 710 are active when the radio receiver 100 is turned on or active.

Figure 8A:
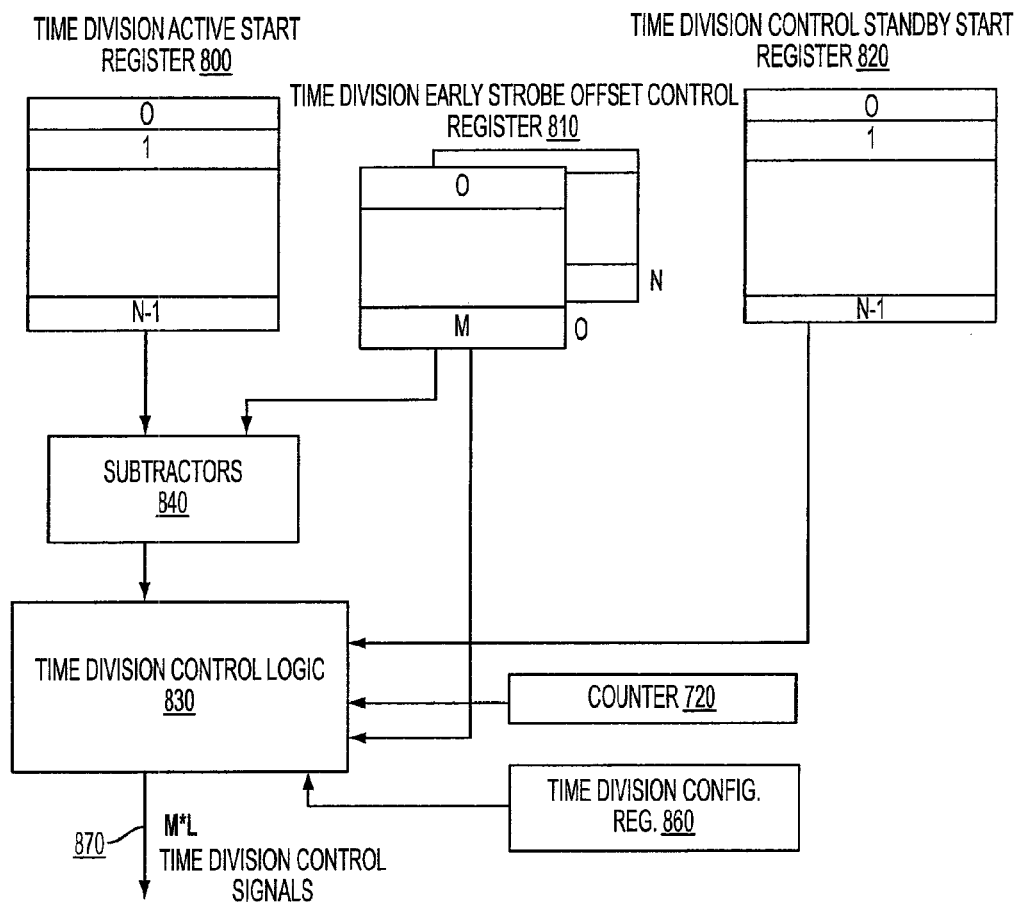
FIG. 8a shows an exemplary DAB/T-DMB tuner with direct conversion architecture whose power dissipation is controlled by time division.

FIG. 8a shows an exemplary implementation of the programmable time division control logic 830 in an embodiment of the present invention. The symbol detect module 740 in FIG. 7 can detect the null symbol 340 (FIG. 3a) and the sync symbol 350 (FIG. 3a) which are deterministic and known markers in the transmission frame 300.

In other embodiments, the value of the counter 720 can be derived by comparing the counter 720 against a value corresponding to the duration of the transmission frame 300 on detection of the null symbol 340. If the sync symbol 350 detection is used, then the counter 720 is loaded with a quotient obtained by dividing TNULL by the clock period of the TS_CLK (e.g., quotient=2656 for 2.048 MHz clock in transmission mode 1). After the initialization, the null symbols 340/sync symbols 350 are used to ensure that the TS_CLK is locked to the transmitter clock. In one example, the programmable time division control logic 710 is controlled by a 2.048 clock (TS_CLK) which is derived from the transmitted symbols and counter 720. In another embodiment, a different clock frequency with a faster clock would allow for finer grain of offset control. The counter 720 can reset at the start of the transmission frame 300.

Time division active start register 800, a time division early strobe offset control register 810, and a time division control standby start register 820 are programmable registers. Time division active start register 800 can be programmed with the clock signal from the beginning of the transmission frame 300. Similarly, the time division control standby start register 820 can also be programmed with the clock signal from the beginning of the transmission frame 300. In some embodiments, there is no explicit prey symbol state 57 (FIG. 5a). The time division active start register 800 can transition the radio receiver 100 into the active mode prior to the symbol boundary of the capacity unit of interest. The registers are further discussed in Table 3 of FIG. 8b detailing exemplary register information.

In various embodiments, the programmable time division control logic 830 is scalable to allow the user to listen to N services. As a result, there are N registers of the time division active start register 800 and the time division control standby start register 820 to correspond to the N possible services. In one embodiment, time division active start register 800 and the time division control standby start register 820 are programmed in an ascending order. At the beginning of the transmission frame 300, an index can point to register 0 of the time division active start register 800 and the time division control standby start register 820. After each active to standby transition, the index can increment by 1 and the frame start indicator signal can reset the index back to 0.

An exemplary time division configuration register (time division config. reg.) 860 comprises an enable bit for each service. The bits that are set in the time division config. reg. 860 can be in sequence and the number of bits set corresponds to the number of services requested by the user.

The exemplary time division early strobe offset control registers 810 is used to generate early wakeup strobes for circuits that require longer settling times. There may be N sets of M time division early strobe offset control registers 810. The N sets can correspond to the N possible services. In some embodiments, there are N different sets because the wakeup time of the components can vary depending on the power down state of the circuit. This condition may occur because the duration of the standby mode is a variable. The duration of the standby mode may be so small that it is not possible to completely power down some circuits. Hence each service may use a unique power down state of the component in a degenerate case.

The M registers of time division early strobe offset control registers 810 can correspond to the M possible offsets. M is the cardinality of the OFFSET_SET (described herein). The time division early strobe offset control registers 810 can be indexed by the service number as described above. The M subtractors 840, can subtract the offset field of the corresponding time division early strobe offset control registers 810 from the time division active start registers 800. The differences from the subtractors 840 may be the values in the 2.048 MHz Clock from the start of the transmission frame 300 which can trigger generation of the corresponding circuit activation strobes. The strobes are generated by comparing the result from the subtractors 840 and the counter 720. This is done by comparators in the time division control logic 830.

The exemplary time division control logic 830 generates time division logic signals and forwards these signals over time division bus 870. In some embodiments, the time division bus 870 is M*L in size (i.e., there are M strobe buses each L bit wide where L corresponds to the tiers of power states.) The L Bits can be encoded as one-hot to represent a power state. In one example, the time division early strobe offset control register 810 generates a power state field signal that can be driven on the corresponding strobe bus when the transition to standby occurs. When the strobe indicates that it is time to transition from standby to active, the L bits are driven with the active state to wakeup the component. The generation of the strobe can be controlled by the time division control logic 830.

Registers 800, 810, 820 and 860 are programmed and provide a mechanism to change the multiplex configuration without disruption. In some embodiments, the programming of registers 800, 810, 820 and 860 is controlled by the payload processor 170 (FIG. 1) and an algorithm is used to find the optimal low power mode for each standby to active transitions in the main service channel 330 (FIG. 3a). The multiplex configuration can change when the receiver powers up, user requests addition, removal, or modification to the services that the user wants to access, or when there is a multiplex reconfiguration event. The new multiplex configuration can take place at logical frame boundaries. A logical frame count is a notional count and is defined as the value of the CIF counter corresponding to the first CIF of the logical frame. A multiplex reconfiguration mechanism is well known in the art.

One example of handling a multiplex reconfiguration event is to have a shadow copy of registers 800, 810, 820 and 860. A processing entity can parse the multiplex reconfiguration and program the shadow copy. When the CIF counter indicates that the new multiplex values are in effect then a switch can be made to the shadow copy. Another example, would be to have only one set of registers but reprogram the registers at the start of the transmission frame 300 from which the new multiplex is effective before the main service channel is transmitted (e.g., during the Sync symbol 350 (FIG. 3a) and fast information channel 320 (FIG. 3a) phases).

In some embodiments, the payload processor 170 is used for audio decompression, higher layer protocol processing (non-physical layer), additional error correction, and user interface control. The radio receiver 100 (FIG. 1) can decompress the audio packets at a constant rate whenever the radio receiver 100 turns on. The audio processing block can be constantly running and the user interface control processing can be reactive. If the higher layer protocol processing need not be performed during the standby state 56 (FIG. 5A), then the clock rate of the payload processor 170 can be scaled dynamically by the time division control logic 830. The processor clock can be scaled back to the minimum required so as to be able to perform the audio processing and other tasks required during the standby state 56. If the audio processing is being done in specialized hardware or a specialized hardware accelerator attached to the processor then the clock/clocks signal(s) may be independently controllable from the rest of the payload processor logic 170. This will allow parts of the payload processor 170 core to be in standby state 56.

In another exemplary embodiment, the payload processor 170 is used for audio and video decompression, higher layer protocol processing (non-physical layer) and the user interface control. The radio receiver 100 can decompress the audio and video packets at a constant rate whenever the radio receiver 100 turns on. Hence the audio/video processing block may be constantly running and the audio/video processing can be at a constant rate to maintain smooth playout. The user interface control processing can be reactive and variable, and the higher layer protocol processing need not be performed during the standby state 56. The clock rate of the payload processor 170 can be scaled dynamically by the time division control logic 830. The payload processor 170 clock can be scaled back to the minimum required so as to be able to perform the audio/video processing and other tasks required during the standby state 56. If the audio/video processing is being done in specialized hardware or a specialized hardware attached to the processor then the clock/clocks signal(s) can be independently controllable from the rest of the payload processor logic 170. This will allow parts of the payload processor 170 core to be in standby mode 411.

Figure 9:
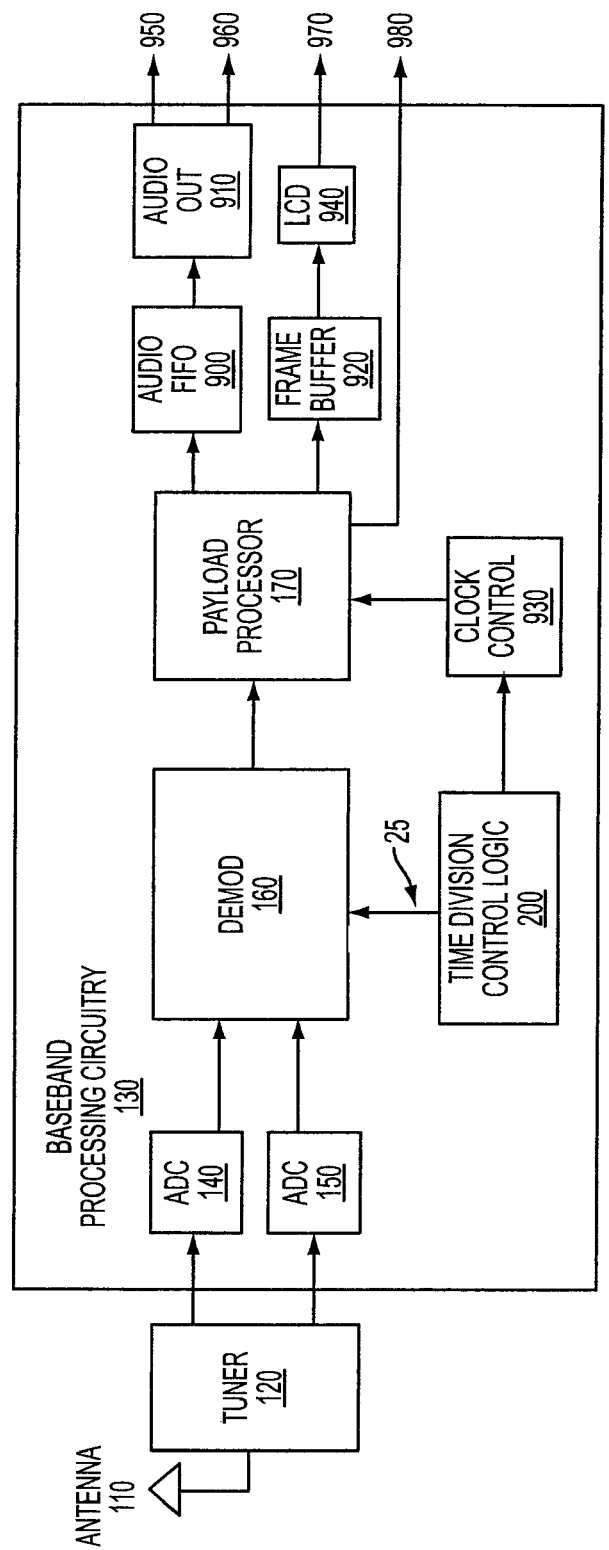
FIG. 9 shows an exemplary audio, video, and data DAB/T-DMB receiver with time division dynamically controlling the clock to portions of the receiver in an embodiment of the present invention.

FIG. 9 shows an exemplary audio, video, and data DAB/T-DMB radio receiver with time division dynamically controlling the clock to portions of the radio receiver in an embodiment of the present invention. In this embodiment, the payload processor 170 is responsible for the frame processing, decryption, audio decompression, MPEG transport stream demultiplexing, and MPEG/H.264 decompression. Audio out 910 can generate audio signals for forwarding over audio paths 950 and 960 at a constant rate. Audio FIFO 900 and frame buffer 920 can comprise smoothing buffers for the audio and video, respectively.

The audio out 910 receives the audio signal from the audio FIFO 900 at a constant rate and converts the audio signal to an analog signal and amplifies the audio signal. In one embodiment, the audio out 910 also drives a pair of headphones, speakers, and other output devices. Similarly, a LCD controller 940 reads the frame buffer 901 at a constant rate and drives via a LCD screen over LCD path 970. An optional interface signal 980 is used to interface with an input/output device. Examples of input/output devices include keypads, keyboards, or touchscreens. In some embodiments, the audio FIFO 900, audio out 910, frame buffer 920, and LCD controller 940 can be constantly running. A clock control 930 can interface with the time division control logic 200 to perform dynamic clock adjustment.

While the present invention has been described in terms of exemplary embodiments, it will be apparent to those skilled in the art that various modifications can be made to the described embodiments without departing from the broader scope of the present invention. Therefore, these and other variations upon the exemplary embodiments are intended to be covered by the present invention.

What is claimed is:

1. A system for power conservation in a receiver device, comprising:
    a tuner that receives a signal at the receiver device;
    a demodulator that demodulates a sampled signal into a demodulated signal;
    a payload processor that processes the demodulated signal into an output format; and
    time division control logic stored in a memory device and executable by one or more processors to generate a control signal to switch a component within the receiver device between modes to conserve power, wherein the time division control logic is further executable to power off the component during a cyclic prefix time.

2. The system of claim 1, wherein the modes include an active mode, a standby mode, a power off mode, or a low power mode.

3. The system of claim 1, wherein the modes include a plurality of staggered modes.

4. The system of claim 1, wherein the time division control logic is further executable to determine the component for which to switch modes.

5. A method for conserving power in a receiver device, comprising:
    receiving a signal at the receiver device;
    demodulating a sampled signal of the received signal into a demodulated signal;
    processing the demodulated signal into an output format; and
    generating a control signal to switch a component within the receiver device between modes to conserve power during a cyclic prefix time.

6. The method of claim 5, wherein the modes include an active mode, a standby mode, a power off mode, or a low power mode.

7. The method of claim 5, wherein generating the control signal comprises generating a control signal that transitions the component between a plurality of staggered modes.

8. The method of claim 5 further comprising determining the component in which to switch modes.

9. The method of claim 5 further comprising determining when to wake up the component when the component is in a standby mode or power off mode.

10. A system for power conservation in a receiver device, comprising:
    time division control logic stored in a memory device and executable by one or more processors to:
        generate a first control signal that switches a first component within the receiver device between power modes in response to a request for a service issued by a user,
        generate a second control signal that switches a second component within the receiver device between power modes, and
        generate a third control signal that configures a third component to adjust a frequency of operation associated with the third component,
    wherein transitions between the power modes are timed to occur non-simultaneously for the first component and the second component.

11. The system of claim 10 further comprising a payload processor that is configured to process a received signal into a transmission frame having multiple channels corresponding to services, wherein a service occupies a continuous timeslot in the transmission frame.

12. The system of claim 11, wherein the power modes include a power conservation mode that is entered during a synchronization channel in the transmission frame.

13. The system of claim 11, wherein the power modes include a power conservation mode that is activated during a sub-channel in the transmission frame that corresponds to an unrequested service.

14. The system of claim 11, wherein the power modes include a power conservation mode that is entered during a fast information channel in the transmission frame.

15. The system of claim 10, wherein a transition to an active power mode is timed to occur a programmable number of symbols prior to a symbol of interest.

16. The system of claim 15, wherein the programmable number of symbols is selected in order to allow adequate time to determine estimated channel parameters.

17. A method for conserving power in a receiver device, comprising:
   generating a first control signal to switch a first component within the receiver device between power modes;
   generating a second control signal to switch a second component within the receiver device between power modes, wherein transitions between the power modes occur independently between the first control signal and the second control signal; and
   generating a third control signal to configure a third component to adjust a frequency of operation associated with the third component.

18. The method of claim 17 further comprising:
   processing a received signal into a transmission frame having multiple channels corresponding to services, wherein a service occupies a continuous timeslot in the transmission frame; and
   determining a first time slot in the transmission frame corresponding to a service requested by a user, wherein the first control signal is based on the first time slot.

19. The method of claim 18 further comprising determining a second time slot in the transmission frame corresponding to a second service requested by the user, wherein the second control signal is based on the second time slot.

20. The system of claim 10, wherein the frequency of operation is adjusted based on a type of a service, number of services, or both, requested by a user.

21. The method of claim 17, wherein the frequency of operation is adjusted based on a type of a service, number of services, or both, requested by a user.

\* \* \* \* \*